(12) United States Patent
Yang

(10) Patent No.: US 9,616,926 B2
(45) Date of Patent: Apr. 11, 2017

(54) STEERING ASSISTANCE APPARATUS AND METHOD FOR VEHICLES

(71) Applicant: HYUNDAI MOTOR COMPANY, Seoul (KR)

(72) Inventor: Dong Hun Yang, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 13 days.

(21) Appl. No.: 14/811,679

(22) Filed: Jul. 28, 2015

(65) Prior Publication Data

US 2016/0214646 A1    Jul. 28, 2016

(30) Foreign Application Priority Data

Jan. 28, 2015  (KR) .......................... 10-2015-0013595

(51) Int. Cl.
   *B62D 15/00*  (2006.01)
   *B62D 15/02*  (2006.01)

(52) U.S. Cl.
   CPC ....... *B62D 15/027* (2013.01); *B62D 15/0285* (2013.01)

(58) Field of Classification Search
   None
   See application file for complete search history.

(56) References Cited

U.S. PATENT DOCUMENTS

| 7,890,231 B2 | 2/2011 | Saito et al. | |
| 9,156,497 B2* | 10/2015 | Reichel | B62D 15/0285 |
| 2011/0251755 A1* | 10/2011 | Widmann | B60R 1/00 |
| | | | 701/36 |
| 2011/0276225 A1* | 11/2011 | Nefcy | G08G 1/168 |
| | | | 701/41 |
| 2012/0044708 A1* | 2/2012 | Schmidt | B60Q 1/12 |
| | | | 362/466 |
| 2013/0142598 A1* | 6/2013 | Mocquard | E04H 6/12 |
| | | | 414/228 |

FOREIGN PATENT DOCUMENTS

| JP | 2000-128006 A | 5/2000 |
| JP | 2008-242795 A | 10/2008 |
| JP | 2009-042155 A | 2/2009 |
| JP | 2009-208601 A | 9/2009 |
| JP | 2014-031039 A | 2/2014 |
| KR | 2010-0000835 A | 1/2010 |
| KR | 10-1364391 B1 | 2/2014 |

OTHER PUBLICATIONS

NPL-KR20100000835_Translate Jan. 6, 2010.*

* cited by examiner

*Primary Examiner* — Truc M Do
(74) *Attorney, Agent, or Firm* — McDermott Will & Emery LLP

(57) ABSTRACT

A steering assistance apparatus and method for a vehicle controls a steering of the vehicle by cognizing a surrounding space at the time of entry and exit of the vehicle, in a parking lot in which an entry and exit road is designed in a helix form. The apparatus includes a sensor module configured to sense at least one of an entry of the vehicle into a parking lot, and an exit of the vehicle from the parking lot, and sense whether the driving road in which the vehicle is driving is a ramp. The apparatus includes a control module configured to control steering of the vehicle within the parking lot by enabling a ramp parking area steering assist mode based on the sensing.

5 Claims, 4 Drawing Sheets

STEERING ASSISTANCE APPARATUS AND METHOD FOR VEHICLES

CROSS-REFERENCE TO RELATED APPLICATION

This application is based on and claims the benefit of priority to Korean Patent Application No. 10-2015-0013595, filed on Jan. 28, 2015 in the Korean Intellectual Property Office, the disclosure of which is incorporated herein in its entirety by reference.

TECHNICAL FIELD

The present disclosure relates to a steering assistance apparatus and method for a vehicle, and more particularly, to a steering assistance apparatus and method for a vehicle for assisting a steering of a driver by cognizing a surrounding space at the time of entry and exit of the vehicle, in a parking lot in which an entry and exit road is designed in a helix form.

BACKGROUND

Generally, a parking lot (e.g., an indoor parking lot) in which an entry and exit road is designed in a helix form is provided in a mart, a department store, or the like. When a driver drives on the entry and exit road, a driver who is not used to driving may cause a collision of the driving vehicle with a wall surface of the entry and exit road, a curbstone positioned at the entry and exit road, or the like. As a result, it is likely to cause damage to the vehicle or inflict injury on vehicle passengers.

Differently from a general road, the helical entry and exit road is a road about which most drivers feel uneasy and may not prevent damage to a vehicle without a driver performing accurate steering.

The known steering assistance apparatuses for the vehicles assist only the steering of the driver on a general road and do not assist the steering of the driver at the helical entry and exit roads.

SUMMARY

The present disclosure has been made to solve the above-mentioned problems occurring in the prior art while advantages achieved by the prior art are maintained intact.

An aspect of the present disclosure provides a steering assistance apparatus and method for a vehicle capable of assisting steering of a driver by cognizing surrounding spaces at the time of entry and exit of the vehicle, in a parking lot in which an entry and exit road is designed in a helix form.

The foregoing and other objects, features, aspects and advantages of the present disclosure will be understood and become more apparent from the following detailed description of the present disclosure. Also, it can be easily understood that the objects and advantages of the present disclosure can be realized by the units and combinations thereof recited in the claims.

According to an exemplary embodiment of the present invention, a steering assistance apparatus for a vehicle includes a sensor module configured to sense at least one of an entry of the vehicle into a parking lot, and an exit of the vehicle from the parking lot, and sense whether a driving road in which the vehicle is driving is a ramp. The steering assistance apparatus also includes a control module configured to control steering of the vehicle within the parking lot by enabling a ramp parking area steering assist mode based on the sensing.

According to another exemplary embodiment of the present invention, a steering assistance method for a vehicle includes sensing at least one of an entry of the vehicle into a parking lot, and an exit of the vehicle from the parking lot. The method further includes enabling a ramp parking area steering assist mode if it is determined that at least one of the entry of the vehicle into the parking lot and the exit of the vehicle from the parking lot is sensed, sensing whether a road on which the vehicle is driving is a ramp, and controlling steering of the vehicle within the parking lot.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The foregoing objects, features and advantages will become more apparent from the following detailed description of exemplary embodiments of the present invention with reference to accompanying drawings, which are set forth hereinafter. Accordingly, those having ordinary knowledge in the related art to which the present disclosure pertains will embody technical ideas or spirit of the present disclosure. Hereinafter, exemplary embodiments of the present invention will be described in detail with reference to the accompanying drawings.

Figure 1:
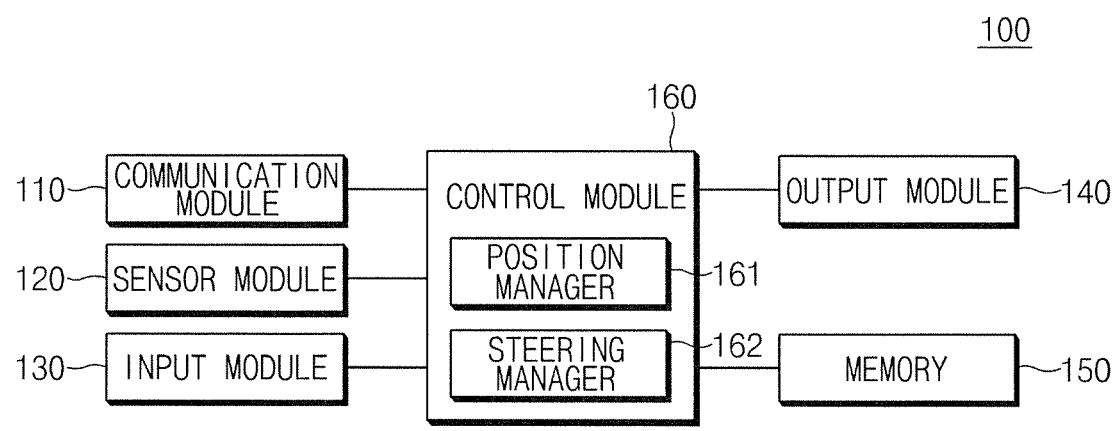
FIG. 1 is a block diagram illustrating a main configuration of a steering assistance apparatus for a vehicle, according to an exemplary embodiment of the present invention.
Figure 2:
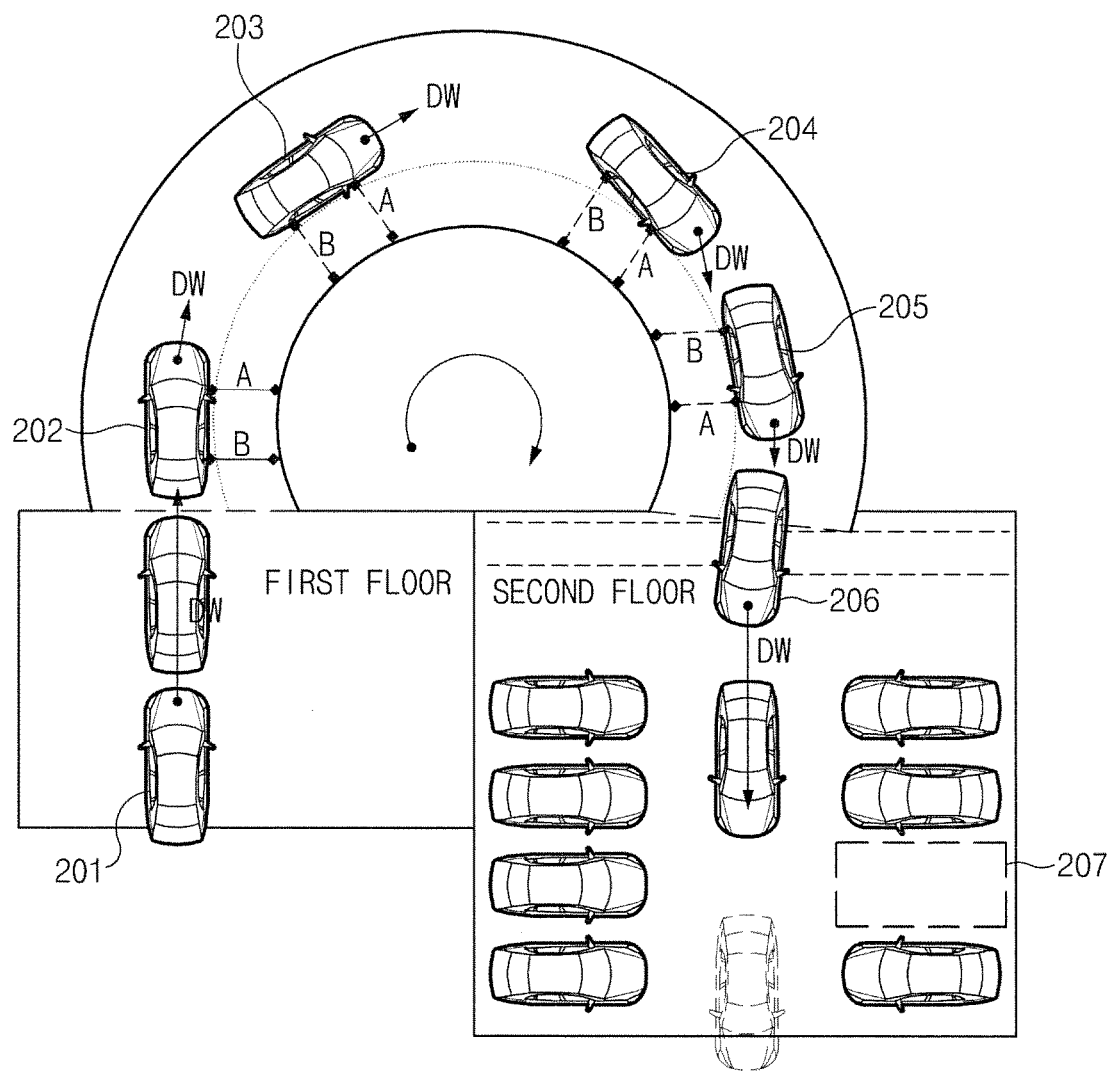
FIG. 2 is an exemplified diagram for describing a steering assistance method for a vehicle, according to an exemplary embodiment of the present invention.

FIG. 1 is a block diagram illustrating a main configuration of a steering assistance apparatus for a vehicle, according to an exemplary embodiment of the present invention. FIG. 2 is an exemplified diagram for describing a steering assistance method for a vehicle, according to an exemplary embodiment of the present invention.

Referring to FIGS. 1 and 2, a steering assistance apparatus 100 for a vehicle according to an exemplary embodiment of the present invention may include a communication module 110, a sensor module 120, an input module 130, an output module 140, a memory 150, and a control module 160.

The communication module 110 may perform communications among the sensor module 120, the input module 130, the output module 140, the memory 150, and the control module 160 through various intra-vehicle communications such as a controller area network (CAN), a CAN with flexible data rate (CAN-FD), an automotive network communication protocol (FlexRay), a media oriented systems transport (MOST), and a time triggered Ethernet (TT Ethernet). The communication module 110 performs communication with at least one of a repeater and a base station which are installed outside a vehicle and may receive a position of the vehicle measured by a triangulation method from the repeater or the base station.

The sensor module 120 may include a speed sensor, a gradient measurement sensor, or the like, for acquiring driving information on a driving vehicle and may include an ultrasonic sensor, or the like for sensing a distance between an object positioned around the vehicle and the vehicle. The sensor module 120 may include a global positioning system (GPS) sensor for confirming the position of the vehicle. The sensor module 120 may include an image sensor for acquiring image data for inside of the parking lot or parking garage in which the vehicle is driving. The sensor module 120 may provide sensing information acquired by a group of sensors to the control module 160 through the communication module 110.

The input module 130 may generate a control signal depending on an input from the outside. To this end, the input module 130 may be formed as input devices such as a keypad, a touch pad, and a touch screen, and when the input module 130 is formed as a touch screen, the input module 130 may also serve as the output module 140.

The output module 140 may output the driving information on the vehicle by a control of the control module 160. In particular, the output module 140 may output the acquired image data for the parking lot or garage in which the vehicle is positioned. To this end, the output module 140 may be configured as output apparatuses such as a liquid crystal device (LCD) and a touch screen.

The memory 150 may store a set of programs for controlling the steering assistance apparatus 100. To this end, the memory 150 may store a program for calculating a width of a road on which the vehicle is driving, based on the vehicle, and a program for confirming a ratio of a distance from a front wheel of the vehicle to an object positioned at a right of the vehicle, for example, a wall of an entry and exit road to a distance from a rear wheel of the vehicle to the wall of the entry and exit road position at the right of the vehicle, based on a driving direction of the vehicle. The memory 150 may store a program for controlling a steering depending on the confirmed distance ratio when the vehicle is positioned at the entry and exit road, a program for parking the vehicle in a specific parking space when the vehicle enters the parking space, and a program for un-parking the vehicle parked in the specific parking space.

The control module 160 may enable a ramp parking area steering assist (RPAS) mode depending on whether the vehicle sensed by the sensor module 120 enters the parking lot, whether the vehicle exits the parking lot, or whether a driving road is a ramp to control the steering of the vehicle within the parking lot. For this purpose, the control module 160 may include a position manager 161 and a steering manager 162.

The position manager 161 may confirm the position of the driving vehicle based on the sensing information received from the group of sensors included in the sensor module 120. According to the exemplary embodiment of the present invention, the position manager 161 may confirm the driving speed of the vehicles sensed by the speed sensor included in the sensor module 120 to confirm that the vehicle enters the parking lot when the driving speed of the vehicle is equal to or less than a threshold speed and a road on which the vehicle is driving is not an express way, a general road, or the like, but is a road through which the vehicle enters the parking lot. Further, the position manager 161 may confirm the driving speed of the vehicles sensed by the speed sensor included in the sensor module 120 to confirm that the vehicle exits the parking lot when the driving speed of the vehicle is equal to or more than a threshold speed and a road on which the vehicle is driving is an express way, a general road, or the like.

According to the exemplary embodiment of the present invention, the position manger 161 may confirm a current position of the vehicle based on communication with the global positioning system (GPS) sensor included in the sensor module 120 or the repeater which is installed outside the vehicle. In particular, the position manager 161 may confirm whether the driving vehicle enters the parking lot based on the communication with the GPS sensor, the repeater, or the like. Further, the position manager 161 may confirm that the vehicle exits the parking lot if the vehicle starts on and then the current position of the vehicle is confirmed after a threshold time lapses.

The steering manager 162 may perform the steering control on the vehicle which enters the parking lot and then needs to be parked and the steering manager 162 may perform the steering control on the vehicle to be un-parked to exit the parking lot.

First, if it is determined from the confirmation result by the position manager 161 that the vehicle enters the parking lot, for example, the vehicle passes through position 201 in FIG. 2, the steering manager 162 may enable the RPAS mode. In this case, the parking lot may be formed to have a structure in which multiple floors as illustrated in FIG. 2 are formed and thus the vehicle may enter a specific floor having the set of parking spaces through the entry and exit road formed as a helical ramp. Further, the parking lot may be formed to have various structures like a structure in which the parking lot is formed as a single floor and thus the vehicle may directly enter the parking space from an inlet of the parking lot without the entry and exit road formed as the helical ramp. For convenience of explanation, the exemplary embodiment of the present invention will describe, as an example, the parking lot including the floors having the entry and exit road formed as the helical ramp as illustrated in FIG. 2.

When the RPAS mode is enabled, the steering manager 162 may confirm a gradient of the road on which the vehicle is driving based on the sensor information provided from a gradient measurement sensor included in the sensor module 120. The steering manager 162 may select the RPAS mode as a right reference steering control mode depending on the gradient of the road and the driving direction of the vehicle, a left reference steering control mode depending on the driving direction of the vehicle, and a RPAS mode release. In this case, the RPAS mode may also be selected by the driver.

The steering manager 162 may calculate a ratio of a distance from a front wheel of the vehicle which is driving on the entry and exit road to a wall to a distance from a rear wheel of the vehicle to the wall to calculate a steering angle in real time so as to keep the distance ratio constant, thereby controlling the steering angle. When the gradient is confirmed from the position 202 of FIG. 2, the steering manager 162 may measure distance A from the front wheel of the vehicle to the wall and a distance B from the rear wheel of the vehicle to the wall based on a driving direction DW of the vehicle by using the sensing information provided from the ultrasonic sensor included in the sensor module 120.

The steering manager 162 may measure the A and B in real time and calculate the distance ratio between the A and B in real time. The steering manager 162 may control the steering of the vehicle to keep the A and B at a predetermined ratio.

The steering manger 162 may confirm that a ramp, for example, an entry and exit road of a road on which the vehicle is driving ends when a width of the road on which the vehicle is driving at a present timing, for example, a width between objects present at the right and left of the vehicle which are sensed by the sensor module 120 and the vehicle, is increased above a threshold value or larger as compared with a width of a road on which the vehicle is driving at a previous timing. In this aspect, an example in which the vehicle is present at position 206 of FIG. 2 may be described. In this case, the control module 160 may cognize that when the time for which the state in which the width of the road is increased to be equal to or larger than a threshold value is maintained is equal to or more than a threshold time, the entry and exit road on which the vehicle is driving ends and the vehicle enters the parking space of the parking lot.

The steering manager 162 may activate a smart parking assistant system (SPAS). The steering manager 162 may confirm a specific parking space 207 in which the vehicle may be parked and may control the steering of the vehicle to park the vehicle in the specific parking space 207.

Second, as the confirmation result by the position manager 161, the steering manager 162 may call the position of the vehicle stored in the memory 150 prior to the starting off to confirm the position of the vehicle when the parked vehicle starts on to allow the vehicle to exit the parking lot.

If it is confirmed that the vehicle is positioned in the parking lot, the steering manager 162 may activate the smart parking assistant system to un-park the vehicle parked in the specific parking lot. The steering manager 162 may control the steering of the vehicle to un-park the vehicle parked in the specific parking space.

The steering manager 162 may confirm the gradient of the road on which the vehicle is driving after the vehicle is un-parked, based on the sensing information provided from an acceleration measurement sensor included in the sensor module 120. If it is confirmed that a road on which the vehicle is driving has a gradient, the steering manager 162 may confirm that the vehicle enters the entry and exit road to allow the vehicle to exit the parking lot. The steering manager 162 may enable the RPAS mode. In this case, the RPAS mode may also be enabled by an input of a driver.

The steering manager 162 may control the steering of the vehicle while the vehicle is driving on the entry and exit road. According to the exemplary embodiment of the present invention, the steering manager 162 may sense the width of the road on which the vehicle is driving, for example, the width of the entry and exit road. The steering manager 162 may confirm the distance from the front wheel of the vehicle to an object positioned at the right of the vehicle, for example, the wall of the entry and exit road and the distance from the rear wheel of the vehicle to the wall of the entry and exit road positioned at the right of the vehicle based on the driving direction of the vehicle. The steering manager 162 may calculate the ratio of the distance from the front wheel of the vehicle to the wall to the distance from the rear wheel of the vehicle to the wall to calculate the steering angle in real time so as to keep the distance ratio constant, thereby controlling the steering angle.

The steering manager 162 may deactivate the smart parking assistant system and the RPAS mode if it is confirmed that the vehicle exits the parking lot.

Figure 3:
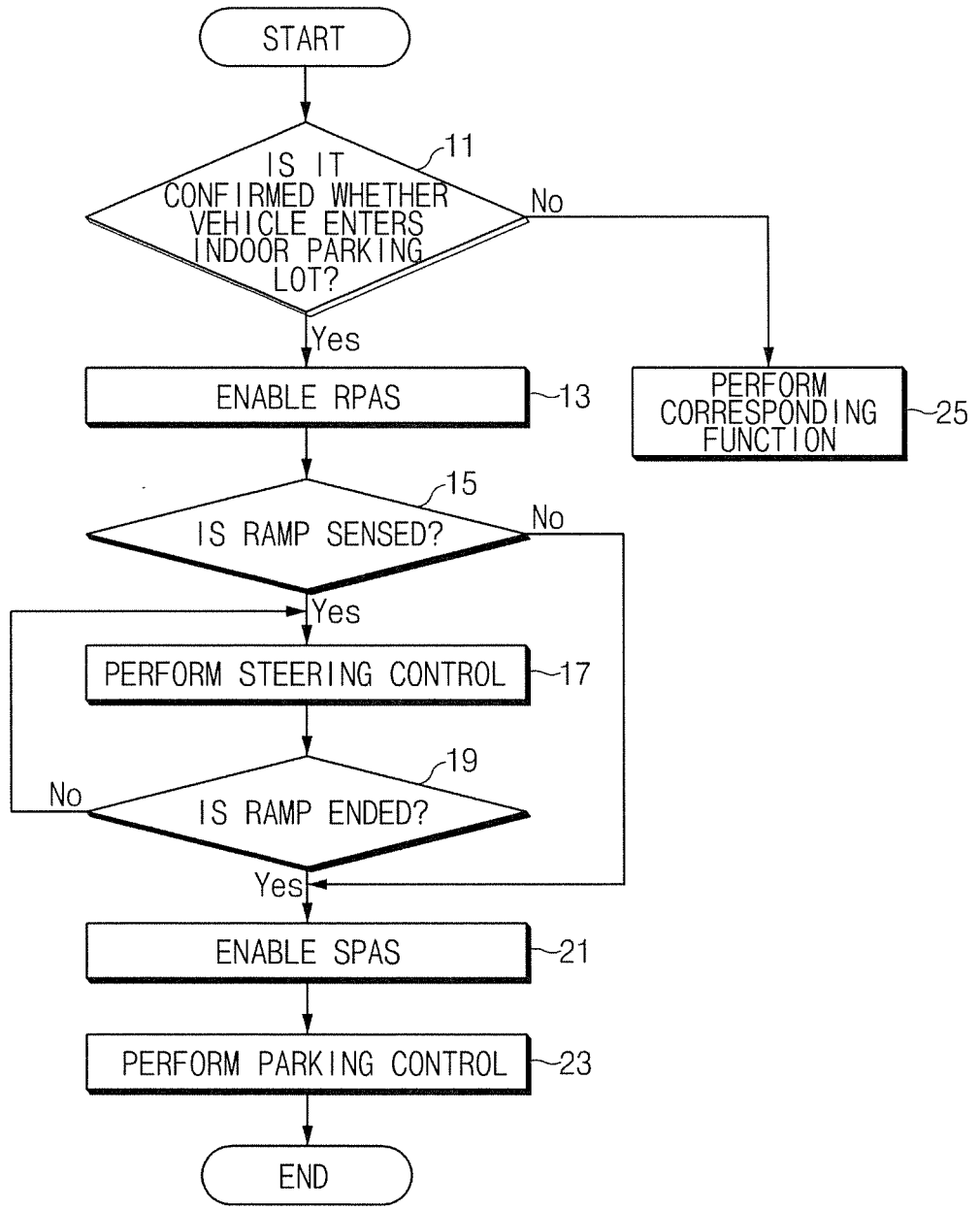
FIG. 3 is a flowchart for describing a steering assistance method for a vehicle when the vehicle enters a parking lot, according to an exemplary embodiment of the present invention.

FIG. 3 is a flowchart for describing a steering assistance method for a vehicle when the vehicle enters the parking lot, according to the exemplary embodiment of the present invention.

Referring to FIGS. 1 to 3, in step 11, the control module 160 may confirm whether the vehicle enters the parking lot. The control module 160 may confirm a current position of the vehicle based on communication with the global positioning system (GPS) sensor included in the sensor module 120, the communication module 110, the repeater installed outside the vehicle, or the like. In particular, the control module 160 may confirm whether the driving vehicle enters the parking lot based on the communication with the GPS sensor, the repeater, or the like.

The control module 160 may confirm the driving speed of the vehicles sensed by the speed sensor included in the sensor module 120 to confirm that the vehicle enters the parking lot when the driving speed of the vehicle is equal to or less than a threshold speed and a road on which the vehicle is driving is not an express way, a general road, or the like but is a road through which the vehicle enters the parking lot.

In step 11, if it is confirmed that the vehicle enters the parking lot, the control module 160 may perform step 13 and if it is not confirmed that the vehicle enters the parking lot, the control module 160 may perform step 25. In step 25, the control module 160 may perform the corresponding functions by an input of vehicle passengers like the positioning of a vehicle, multimedia playing, and opening and closing of a window.

In step 13, the control module 160 may enable the RPAS mode. In this case, for convenience of explanation, the exemplary embodiment of the present invention describes that the RPAS mode is enabled if it is confirmed that the vehicle enters the parking lot, but is not necessarily limited thereto. When the vehicle enters the entry and exit road of the ramp formed in the parking lot, if an input key for enabling the RPAS mode is selected by the driver, the RPAS mode may also be enabled.

In step 15, the control module 160 may confirm whether the vehicle enters the ramp. The parking lot may be formed to have various structures like a structure in which multiple floors are formed and thus the vehicle may enter a specific floor having a set of parking spaces through the entry and exit road formed as the helical ramp and a structure in which a single floor is formed and thus the vehicle may directly enter the parking space from the inlet of the parking lot without the entry and exit road formed as the helical ramp. For convenience of explanation, the exemplary embodiment of the present invention will describe, as an example, the parking lot having the floors having the entry and exit road formed as the helical ramp.

The control module 160 may confirm the gradient of the road on which the vehicle is driving, which is sensed by the gradient measurement sensor included in the sensor module 120. The control module 160 may perform step 17 if it is confirmed that the vehicle is driving on the ramp and may perform step 21 if it is confirmed that the vehicle is driving on a flat road.

In step 17, the control module 160 may perform the steering control of the vehicle based on the enabled RPAS mode. According to the exemplary embodiment of the present invention, the control module 160 may sense the width of the road on which the vehicle is driving, for example, the width of the entry and exit road. The control module 160 may confirm the distance from the front wheel of the vehicle to an object positioned at the right of the vehicle, for example, the wall of the entry and exit road and the distance from the rear wheel of the vehicle to the wall of the entry and exit road positioned at the right of the vehicle based on the driving direction of the vehicle. To this end, the driver may select the right reference steering control mode depending on the driving direction of the vehicle, the left reference steering control mode depending on the driving direction of the vehicle, and the RPAS mode release. The control module 160 may calculate the ratio of the distance from the front wheel of the vehicle to the wall to the distance from the rear wheel of the vehicle to the wall to calculate the steering angle in real time so as to keep the distance ratio constant, thereby controlling the steering angle.

In step 19, if it is confirmed that the ramp of the road on which the vehicle is driving ends, for example, if it is confirmed that the driving of the vehicle on the entry and exit road ends, the control module 160 may perform step 21. If it is not confirmed, in step 19, that the ramp ends, the process may return to step 17 to continuously perform the steering control. The control module 160 may confirm that a ramp, for example, an entry and exit road of a road on which the vehicle is driving ends when a width of the road on which the vehicle is driving at a present timing, for example, a width between objects present at the right and left of the vehicle which are sensed by the sensor module 120 and the vehicle, is increased above a threshold value as compared with a width of a road on which the vehicle is driving at a previous timing. In this case, the control module 160 may cognize that when the time for which the state in which the width of the road is increased to be equal to or larger than a threshold value is maintained is equal to or more than a threshold time, the entry and exit road on which the vehicle is driving ends and the vehicle enters the parking space of the parking lot.

In step 21, the control module 160 may enable the smart parking assistant system (SPAS). In step 23, the control module 160 may perform the parking control of the vehicle which enters the parking space.

Figure 4:
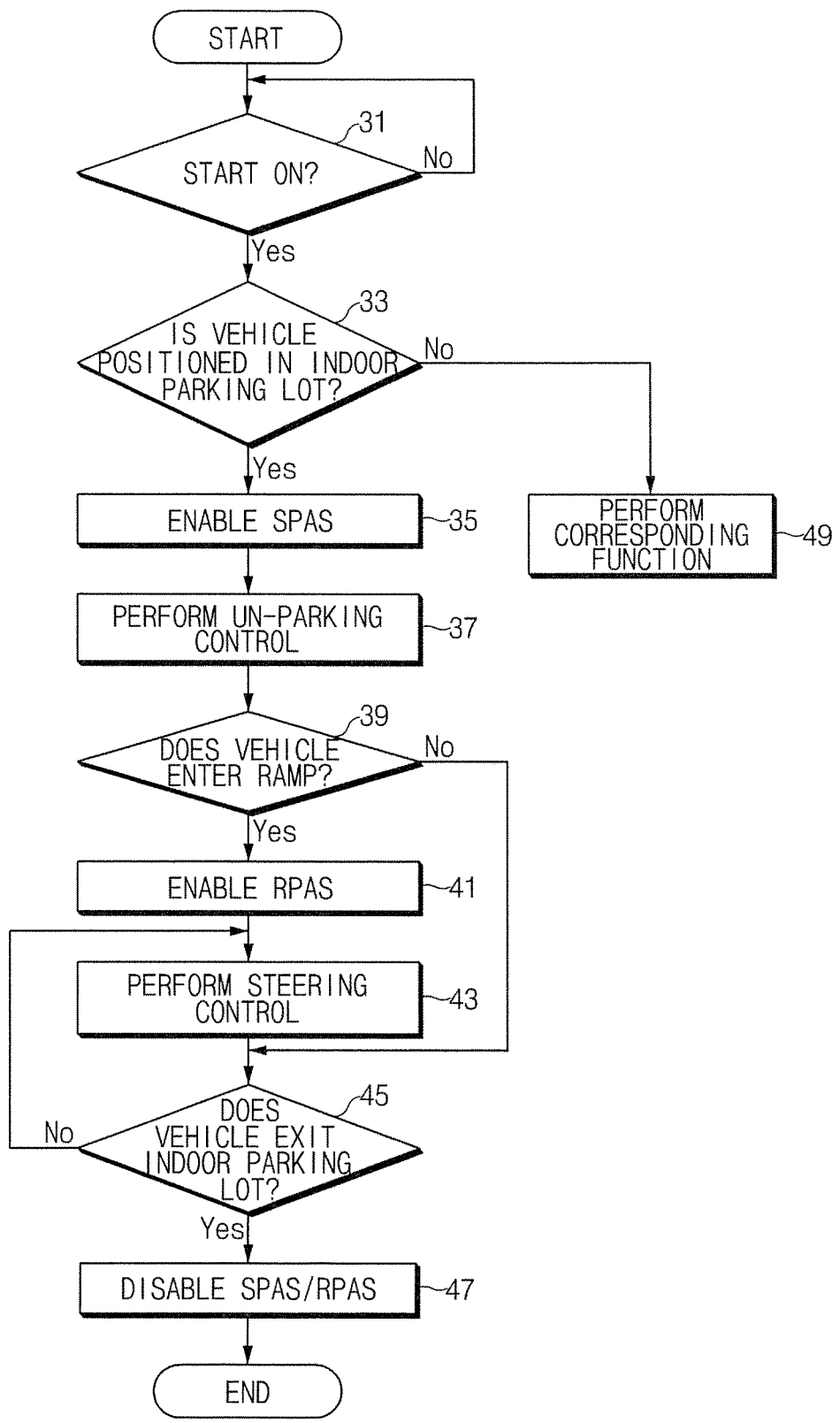
FIG. 4 is a flowchart for describing a steering assistance method for a vehicle when the vehicle exits the parking lot, according to an exemplary embodiment of the present invention.

FIG. 4 is a flowchart for describing a steering assistance method for a vehicle when the vehicle exits the parking lot, according to an exemplary embodiment of the present invention.

Referring to FIGS. 1, 2, and 4, in step 31, the control module 160 may confirm whether the vehicle starts on. When the vehicle starts on, power is supplied to the control module 160, and therefore the control module 160 proceeds to step 33 when power is supplied and may proceed to step 33 when the supply of power is sensed, If power is not supplied the process returns to step 31.

In step 33, the control module 160 may confirm whether the vehicle is currently positioned in the parking lot. The control module 160 may store the position of the vehicle in the memory 150 before the vehicle starts off and may use the position of the vehicle to confirm the current position of the vehicle. In step 33, if it is confirmed that the vehicle is positioned in the parking lot, the control module 160 may perform step 35. However, if in step 33 it is not confirmed that the vehicle is positioned in the parking lot, the control module 160 may perform step 49. In step 49, the control module 160 may perform the corresponding functions by an input of vehicle passengers like the positioning of a vehicle, multimedia playing, and opening and closing of a window.

In step 35, the control module 160 may enable the smart parking assistant system (SPAS) to un-park the vehicle which is parked in the specific parking space of the parking lot. In step 37, the control module 160 may perform the unparking control of the vehicle based on the smart parking assistant system.

In step 39, the control module 160 may confirm whether the vehicle enters the ramp. The control module 160 may confirm the gradient of the road on which the vehicle is driving, which is sensed by the gradient measurement sensor included in the sensor module 120. The control module 160 may perform step 41 if it is confirmed that the vehicle enters the ramp, and may perform step 45 if it is not confirmed that the vehicle enters the ramp. In this case, the control module 160 may confirm that the vehicle enters the entry and exit road of the parking lot if it is confirmed that the vehicle enters the ramp.

In step 41, the control module 160 may enable the RPAS mode. In this case, for convenience of explanation, the exemplary embodiment of the present invention describes that the RPAS mode is enabled if it is confirmed that the vehicle enters the ramp, but is not necessarily limited thereto. When the vehicle enters the ramp, if the input key for enabling the RPAS mode is selected by the driver, the RPAS mode may also be enabled.

In step 43, the control module 160 may perform the steering control. T the control module 160 may sense the width of the road on which the vehicle is driving, for example, the width of the entry and exit road. The control module 160 may confirm the distance from the front wheel of the vehicle to an object positioned at the right of the vehicle, for example, the wall of the entry and exit road and the distance from the rear wheel of the vehicle to the wall of the entry and exit road positioned at the right of the vehicle based on the driving direction of the vehicle. To this end, the driver may select the right reference steering control mode depending on the driving direction of the vehicle, the left reference steering control mode depending on the driving direction of the vehicle, or the RPAS mode release. The control module 160 may calculate the ratio of the distance from the front wheel of the vehicle to the wall to the distance from the rear wheel of the vehicle to the wall to calculate the steering angle in real time so as to keep the distance ratio constant, thereby controlling the steering angle.

In step 45, the control module 160 may confirm whether the vehicle exits the parking lot. According to the exemplary embodiment of the present invention, when the un-parked vehicle in the specific parking space does not enter the ramp, the control module 160 may cognize that the ramp is not formed in the parking lot to perform step 45. In step 45, the control module 160 may confirm a current position of the vehicle based on communication with the global positioning system (GPS) sensor included in the sensor module 120 or the repeater which is installed outside the vehicle. In particular, the control module 160 may confirm whether the driving vehicle exits the parking lot based on the communication with the GPS sensor, the repeater, or the like. The control module 160 may confirm the driving speed of the vehicles sensed by the speed sensor included in the sensor module 120 to confirm that the vehicle exits the parking lot when the driving speed of the vehicle is equal to or more than a threshold speed and a road on which the vehicle is driving is an express way, a general road, or the like. In step 45, if it is confirmed that the vehicle exits the parking lot, in step 47, the control module 160 may end at least one of the RPAS mode and the smart parking assistant system.

As described above, according to the exemplary embodiments of the present invention, it is possible to reduce an accident at the time of driving the entry and exit road of the parking lot by assisting the steering of the driver by cognizing the surrounding spaces at the time of the entry and exit of the vehicle, in the parking lot in which the entry and exit road is designed in the helix form.

Meanwhile, the method according to the exemplary embodiment of the present invention as described above may be prepared by a computer program. Codes and code segments configuring the computer program may be easily deduced by computer programmers in the art. In addition, the computer program is stored in computer readable recording media (information storage media) and is read and executed by computers, thereby implementing the methods according to the present disclosure. Further, the recording media may include any type of recording media which may be read by a computer.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A steering assistance apparatus for a vehicle, comprising:
a sensor module configured to sense at least one of an entry of the vehicle into a parking lot, and an exit of the vehicle from the parking lot, and sense whether a driving road in which the vehicle is driving is a ramp; and
a control module configured to control steering of the vehicle within the parking lot by enabling a ramp parking area steering assist mode based on the sensing of the sensor module,
wherein the sensor module senses a distance between an object around the vehicle and the vehicle when an entry or exit of the vehicle into or from an entry and exit road of the parking lot is sensed, and
wherein the control module controls the steering of the vehicle so as to maintain a distance between a front wheel of the vehicle and the object and a distance between a rear wheel of the vehicle and the object at a predetermined ratio.

2. The steering assistance apparatus according to claim 1, wherein the control module disables the ramp parking area steering assist mode when a width of a road on which the vehicle is driving at a present time is increased above a threshold value as compared with a width of a road on which the vehicle was driving at a previous time.

3. The steering assistance apparatus according to claim 2, wherein the control module activates a smart parking assistant system for parking the vehicle, when it is determined that the vehicle is positioned inside the parking lot and the ramp parking area steering assist mode is disabled.

4. A steering assistance method for a vehicle, comprising:
sensing at least one of an entry of the vehicle into a parking lot, and an exit of the vehicle from the parking lot;
enabling a ramp parking area steering assist mode if it is determined that at least one of the entry of the vehicle into the parking lot and the exit of the vehicle from the parking lot is sensed;
sensing whether a road on which the vehicle is driving is a ramp;
sensing a distance between an object around the vehicle and the vehicle, while the vehicle is driving in an entry and exit road of the parking lot; and
controlling steering of the vehicle within the parking lot, wherein the steering of the vehicle is controlled so as to maintain a distance between a front wheel of the vehicle and the object and a distance between a rear wheel of the vehicle and the object at a predetermined ratio.

5. The steering assistance method according to claim 4, further comprising:
when a width of a road on which the vehicle is driving at a present time is increased above a threshold value as compared with a width of a road on which the vehicle is driving at a previous time,
disabling the ramp parking area steering assist mode, and
activating a smart parking assistant system for parking the vehicle if it is determined that the vehicle is positioned inside the parking lot.

* * * * *